United States Patent
Sumitomo et al.

[11] Patent Number: 5,985,973
[45] Date of Patent: Nov. 16, 1999

[54] POLYPROPYLENE-BASED RESINS AND POLYPROPYLENE-BASED RESIN COMPOSITIONS

[75] Inventors: Takashi Sumitomo, Icihara; Masaru Nakagawa, Icihara; Masatoshi Toda, Icihara; Yutaka Kobayashi, Icihara; Motoki Yamada, Icihara, all of Japan

[73] Assignee: Idemitsu Petrochemical Co., Ltd., Tokyo, Japan

[21] Appl. No.: 08/908,665

[22] Filed: Aug. 6, 1997

[30] Foreign Application Priority Data

Aug. 16, 1996  [JP]  Japan ..................................... 8-216201

[51] Int. Cl.$^6$ .............................. C08K 3/34; C08L 23/12; C08L 53/00; C08L 23/16
[52] U.S. Cl. .............................. 524/451; 525/88; 525/240
[58] Field of Search ........................ 525/240, 88; 524/451

[56] References Cited

U.S. PATENT DOCUMENTS

| | | | |
|---|---|---|---|
| 4,621,114 | 11/1986 | Watanabe | 525/88 |
| 4,914,155 | 4/1990 | Shimomura et al. | 525/88 |
| 5,001,182 | 3/1991 | Maruya et al. | 524/451 |
| 5,308,908 | 5/1994 | Fukui et al. | 525/240 |
| 5,391,618 | 2/1995 | Yamamoto et al. | 525/88 |
| 5,412,020 | 5/1995 | Yamamoto et al. | 525/88 |
| 5,543,454 | 8/1996 | Kamakura et al. | 524/451 |
| 5,591,795 | 1/1997 | Nomura et al. | 524/451 |
| 5,723,527 | 3/1998 | Sadatoshi et al. | 524/451 |
| 5,750,612 | 5/1998 | Zyagawa et al. | 524/451 |
| 5,763,534 | 6/1998 | Srinivasan et al. | 525/240 |
| 5,773,515 | 6/1998 | Srinivasan et al. | 525/240 |
| 5,777,020 | 7/1998 | Nagai et al. | 524/451 |
| 5,804,660 | 9/1998 | Whetten et al. | 525/240 |
| 5,811,494 | 9/1998 | Whetten et al. | 525/240 |

FOREIGN PATENT DOCUMENTS

| | | |
|---|---|---|
| 0 509 662 | 10/1992 | European Pat. Off. . |
| 0 557 124 | 8/1993 | European Pat. Off. . |
| 0 657 500 | 6/1995 | European Pat. Off. . |

*Primary Examiner*—Donald R. Wilson
*Attorney, Agent, or Firm*—Oblon, Spivak, McClelland, Maier & Neustadt, P.C.

[57] ABSTRACT

Disclosed are a polypropylene-based resin and a polypropylene-based resin composition having well-balanced, high-level flowability, stiffness and impact resistance. The polypropylene-based resin has an MI of from 30 to 70 g/10 min and a 25° C. xylene-soluble content, x, of from 5 to 15% by weight, in which the 25° C. xylene-soluble component is such that (a) its ethylene unit content, z, is from 20 to 30% by weight, and (b) its intrinsic viscosity, [72], indecalin at 135° C. is not smaller than 2.00 dl/g, and in which the 25° C. xylene-insoluble component is such that (c) its ethylene unit content, y (% by weight), satisfies the following:

$$100y/[y\times(1-x/100)+x] \leq 1.13z - 16.6,$$

(d) in GPC, the content of its constituent component having a molecular weight of not smaller than $10^6$ is not smaller than 2% by weight, (e) its MI is from 40 to 130 g/10 min, and (f) its stereospecificity index is not smaller than 98.5%. The resin composition comprises (A) from 45 to 90% by weight of the polypropylene-based resin, (B) from 5 to 50% by weight of an ethylenic copolymer, and (C) from 0 to 25% by weight of talc.

6 Claims, 1 Drawing Sheet

POLYPROPYLENE-BASED RESINS AND POLYPROPYLENE-BASED RESIN COMPOSITIONS

FIELD OF THE INVENTION

The present invention relates to polypropylene-based resins and polypropylene-based resin compositions. More precisely, it relates to polypropylene-based resins and polypropylene-based resin compositions, which have well-balanced, high-level flowability, stiffness, tensile breaking elongation and impact resistance that are higher than those of conventional ones, and which are favorably used as housing materials for car parts and various household electric appliances.

BACKGROUND OF THE INVENTION

As having good mechanical characteristics and workability, crystalline polypropylenes are widely used for producing films and various shaped articles in various fields. In particular, they are much used in the field of injection molding. However, since crystalline polypropylenes have poorly-balanced stiffness and impact resistance as compared with polystyrenes and ABS resins, their use is inevitably limited. If their mean molecular weight is increased, crystalline polypropylenes may have improved impact strength and therefore have well-balanced stiffness and impact resistance. However, crystalline polypropylenes having a large mean molecular weight are problematic in that their workability is lowered and, in particular, their producibility in injection molding is significantly lowered. Given this situation, it is desired to improve crystalline polypropylenes so as to have well-balanced stiffness and impact resistance without interfering with their workability.

For the purpose of obtaining crystalline polypropylenes having improved stiffness and elasticity, there is known a two-stage polymerization method of producing a mixture of polymers each having a different molecular weight. For example, JP-A-190006/1982 discloses a method of producing a mixture of polymers of which one has an intrinsic viscosity [η] of from 0.6 to 1.7 dl/g and the other from 1.5 to 4.6 dl/g. JP-A-7406/1983 discloses a method of producing a mixture of polymers of which one has an intrinsic viscosity [η] of from 0.6 to 3.5 dl/g and the other from 5 to 10 dl/g. However, these methods are still insufficient to improve the stiffness and elasticity of polymers.

In JP-A-356511/1992, proposed was a polypropylene that satisfies the following relation between the content, Ai (% by weight) of the constituent component having a molecular weight of from 2,000 to 26,000 and the intrinsic viscosity [η] of the polymer.

$$\log Ai \geq 1.60 - 1.32 \times \log [\eta]$$

Although the polypropylene has improved elasticity and heat resistance, the balance of the stiffness and the impact resistance of the polymer is still not good.

On the other hand, since crystalline polypropylenes generally have poor low-temperature impact strength, they are often improved by adding thereto a rubber-type elastic material such as ethylene-propylene rubber (EPR). The impact resistance of the polymers comprising such a rubber-type elastic material may be improved, but the addition of such a rubber-type elastic material to crystalline polypropylenes is problematic in that the stiffness of the resulting polymer mixtures is inevitably lowered. Therefore, desired is a technique of improving the impact resistance of polypropylene-based resin compositions without lowering their stiffness.

Various techniques of adding ethylene-butene-1 copolymers to polypropylene-based resins have heretofore been tried. For example, known is a technique of adding a specific ethylene-butene-1 copolymer to a polypropylene-based resin to thereby make the resulting resin mixture have well-balanced stiffness and impact resistance (see JP-A-192506/1994 and JP-A-18151/1995). They say that the addition of an ethylene-butene-1 copolymer having a peak melting point of not higher than 80° C. and having a low degree of X-ray crystallinity of smaller than 20% produces better results. JP-A-87478/1997 discloses a technique of adding an ethylene-butene-1 copolymer having a melting point of from 60 to 100° C. to a polypropylene-based resin to thereby improve the balance of the stiffness and the impact resistance of the resulting resin mixture.

However, these polypropylene-based resin compositions comprising such an ethylene-butene-1 copolymer are still problematic in that the balance of their stiffness and impact resistance at high levels is not always satisfactory.

SUMMARY OF THE INVENTION

Given this situation, the present invention is to provide a polypropylene-based resin and a polypropylene-based resin compositions having well-balanced, high-level flowability, stiffness, tensile breaking elongation and impact resistance that are higher than those of conventional polypropylene-based resins and polypropylene-based resin compositions.

In order to attain the above-mentioned object, we, the present inventors have assiduously studied and, as a result, have found that the object is attained by (i) a polypropylene-based resin which has a melt index falling within a specifically-defined range and has a 25° C. xylene-soluble content also falling within a specifically-defined range, and of which the 25° C. xylene-soluble component and -insoluble component have specific properties, (ii) a polypropylene-based resin composition comprising said polypropylene-based resin, a specific copolymer, and optionally talc, in a specific ratio, and (iii) a polypropylene-based resin composition comprising an ordinary polypropylene-based resin, an ethylene-butene-1 copolymer having specific properties, and optionally talc, in a specific ratio. Based on these findings, we have completed the present invention.

Specifically, the present invention provides;

(1) a polypropylene-based resin having a melt index of from 30 to 70 g/10 min and having a 25° C. xylene-soluble content, x, of from 5 to 15% by weight; in which the 25° C. xylene-soluble component is such that (a) its ethylene unit content, z, as obtained through isotopic carbon nuclear magnetic resonance spectrometry ($^{13}$C-NMR) is from 20 to 30% by weight, and (b) its intrinsic viscosity, [η], indecalin at135° C. is not smaller than 2.00 dl/g, and in which the 25° C. xylene-insoluble component is such that (c) its ethylene unit content, y (% by weight), as obtained through isotopic carbon nuclear magnetic resonance spectrometry ($^{13}$C-NMR) satisfies the following relational formula (I):

$$100y/[y \times (1-x/100)+x] \leq 1.13z - 16.6 \qquad (I),$$

(d) in its molecular weight distribution curve as obtained through gel permeation chromatography (GPC) based on polystyrene, the content of its constituent component having a molecular weight of not smaller than $10^6$ is not smaller than 2% by weight, (e) its melt index is from 40 to 130 g/10 min, and (f) its stereospecificity index as obtained through isotopic carbon nuclear magnetic resonance spectrometry ($^{13}$C-NMR) is not smaller than 98.5%;

(2) a polypropylene-based resin composition comprising (A) from 45 to 90% by weight of the polypropylene-based resin of the above-mentioned (1), (B) from 5 to 50% by weight of a copolymer mainly composed of ethylene and/or α-olefins having 3 or more carbon atoms, and (C) from 0 to 25% by weight of talc (this is hereinafter referred to as polypropylene-based resin composition I); and (3) a polypropylene-based resin composition comprising (A') from 45 to 90% by weight of a polypropylene-based resin, (B') from 5 to 50% by weight of an ethylene-butene-1 copolymer having a butene-1 unit content of from 10 to 25 mol %, a melt index of from 0.5 to 10 g/10 min, a peak melting point of from 20 to 50° C., a quantity of heat for crystallization of from 20 to 50 J/g, and a ratio of the quantity of heat for crystallization (J/g) to the butene-1 unit content (mol %) of not smaller than 1.4, and (C) from 0 to 25% by weight of talc (this is hereinafter referred to as polypropylene-based resin composition II).

DISCLOSURE OF THE INVENTION

Figure 1:
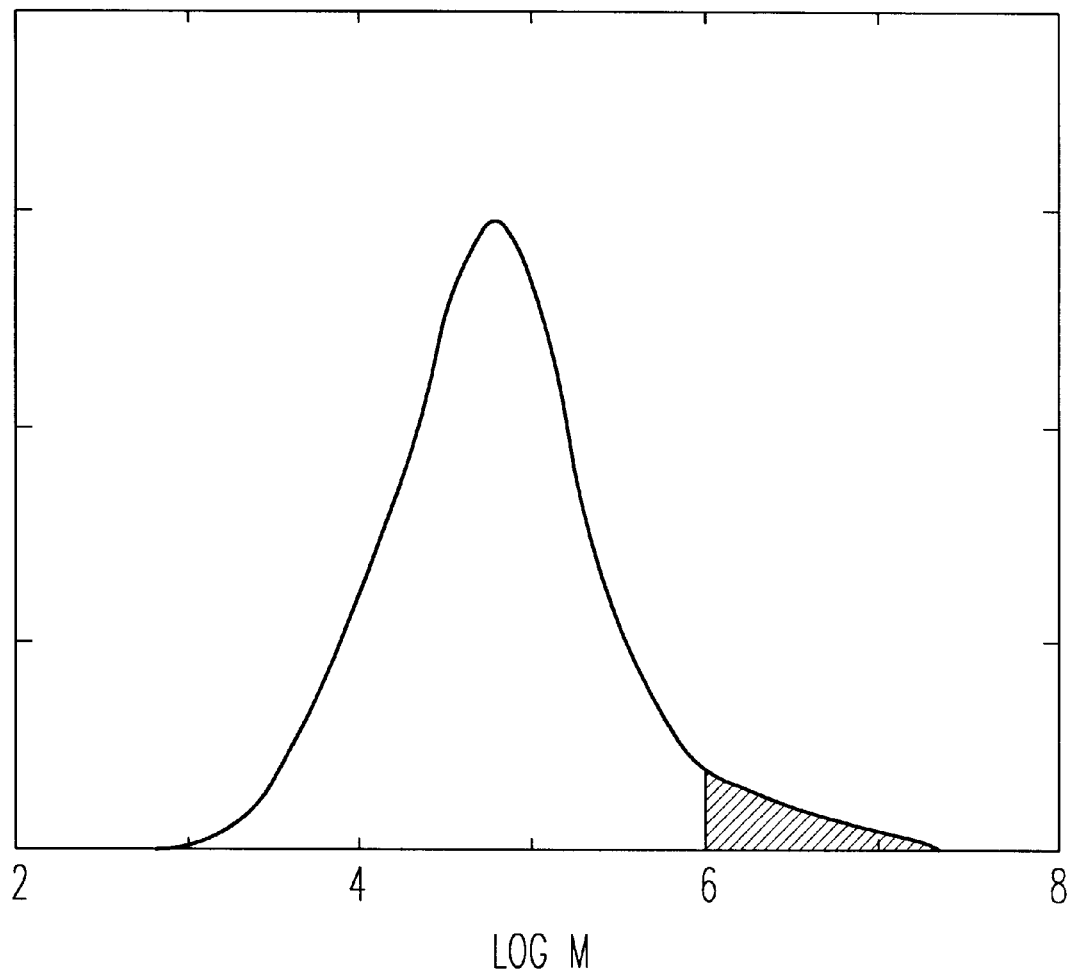
FIG. 1 shows one example of a molecular weight distribution curve, based on polystyrene, of a 25° C. xylene-insoluble component of a polypropylene-based resin.

The measurement of $^{13}$C-NMR as referred to herein was effected in the following manner.

The solution for $^{13}$C-NMR measurement was prepared by dissolving a 220 mg sample in a 3 ml mixed solvent of 1,2,4-trichlorobenzene/deuteriobenzene (90/10, by volume) in a NMR tube. $^{13}$C-NMR measurement was performed according to the following condition.

Device: JNM-EX400 Model, manufactured by JEOL LTD.

Pulse Width: 9 μsec (45°)

Pulse Repetition Time: 4 seconds

Spectral Width: 20000 Hz

Temperature: 130° C.

Accumulation Number: 1000 to 10000 times

The polypropylene-based resin of the present invention has the following properties.

The resin has a melt index (MI) of from 30 to 70 g/10 min. If its MI is smaller than 30 g/10 min, the resin has poor flowability and is therefore poorly worked. If, however, its MI is larger than 70 g/10 min, the impact resistance of the resin is low. From its flowability and impact resistance, the resin preferably has MI of from 35 to 55 g/10 min, more preferably from 37 to 50 g/10 min. The MI of the resin is measured according to JIS K-7210, at a temperature of 230° C. and under a load of 2.16 kg.

The 25° C. xylene-soluble content, x, of the resin falls between 5 and 15% by weight. If its soluble content is smaller than 5% by weight, the resin has poor impact resistance, and its elongation, especially its tensile breaking elongation is poor. However, if its soluble content is larger than 15% by weight, the resin has poor stiffness and poor flowability. In view of the balance of the impact resistance, the stiffness and the fluidity of the resin, the soluble content of the resin is preferably from 5 to 13% by weight, more preferably from 5 to 10% by weight.

The soluble component in the resin must be such that (a) its ethylene unit content, z, as obtained through $^{13}$C-NMR is from 20 to 30% by weight, and (b) its intrinsic viscosity, [η], in decalin at 135° C. is not smaller than 2.00 dl/g. If the ethylene unit content, z, of the soluble component is smaller than 20% by weight, the stiffness of the resin is poor. If, however, the content, z is larger than 30% by weight, the elongation of the resin is poor. In view of the impact resistance and the elongation of the resin, the ethylene unit content, z is preferably from 22 to 30% by weight. If the intrinsic viscosity, [η], of the soluble component in decalin at 135° C. is smaller than 2.00 dl/g, the impact resistance of the resin is poor. From the impact resistance of the resin, the intrinsic viscosity, [η], of the soluble component is preferably not smaller than 2.4 dl/g, more preferably not smaller than 2.6 dl/g.

In the polypropylene-based resin of the invention, the 25° C. xylene-insoluble component must be such that (c) its ethylene unit content, y (% by weight), as obtained through $^{13}$C-NMR, satisfies the following relational formula (I):

$$100y/[y \times (1 \times x/100) + x] \leq 1.13z - 16.6 \tag{I}$$

wherein x indicates the 25° C. xylene-soluble content of the resin (% by weight); and z indicates the ethylene unit content of said soluble component (% by weight), (d) in its molecular weight distribution curve as obtained through GPC based on polystyrene, the content of its constituent component having a molecular weight of not smaller than $10^6$ is not smaller than 2% by weight, (e) its MI is from 40 to 130 g/10 min, and (f) its stereospecificity index as obtained through $^{13}$C-NMR is not smaller than 98.5%.

If the ethylene unit content, y, of the insoluble component in the resin, as obtained through $^{13}$C-NMR, does not satisfy the above-mentioned relational formula (I), the elongation of the resin is poor, and the balance of the stiffness and the impact resistance of the resin is not good. In the molecular weight distribution curve of the insoluble component in the resin, as obtained through GPC based on polystyrene, if the content of its constituent component having a molecular weight of not smaller than $10^6$ is smaller than 2% by weight, the stiffness of the resin is poor. The content of the constitutive component having a molecular weight of not smaller than $10^6$ is obtained in the following manner. The molecular weight distribution of the insoluble component in a resin sample is obtained through GPC, and plotted to give a molecular weight distribution curve of said insoluble component. The entire area below the curve is standardized to be 100, and the ratio of the area of the part of the component having a molecular weight of not smaller than $10^6$ to the entire area of being 100 is obtained and referred to as the content of the constituent component having a molecular weight of not smaller than $10^6$. For example, referred to is FIG. 1, in which the shadow area below the molecular distribution curve indicates the constituent component having a molecular weight of not smaller than $10^6$. In FIG. 1, M is the molecular weight of the constituent component.

Measurement in GPC 20 mg of a sample was completely dissolved in 10 ml of 1,2,4-trichlorobenzene at 150° C. to prepare a sample solution. A calibration curve of standard samples of monodispersed polystyrene (having a molecular weight of from 500 to 5,000,000) was formed using a universal calibration device. The constants for viscosities were as follows:

$$K_{ps} = 1.21 \times 10^{-4}; \alpha_{ps} = 0.707$$

$$K_{pp} = 1.34 \times 10^{-4}; \alpha_{pp} = 0.750$$

The condition for the measurement was as follows:

Columns: Two columns of Shodex UT-806M Model (length: 30 cm) were used.

Solvent: 1,2,4-trichlorobenzene
Temperature: 140° C.
Detector: RI Detector (Waters, 150 c)
Sample Concentration: 0.2% (w/v)
Amount of Sample: 240 μl
Flow Rate: 1.0 ml/min The ethylene unit content of the 25° C. xylene-soluble component, z, and that of the 25° C. xylene-insoluble component, y, are obtained in the following manner.

A resin sample is first subjected to $^{13}$C-NMR. From the intensities of the seven peaks within the range of from 21 to 35 ppm [tetramethylsilane (TMS) chemical shift standard] in the resulting spectral pattern, the triad fractions (mol %) of ethylene (E) and propylene (P) are obtained according to the following equations.

$$f_{EPE}=[K(T\delta\delta)/T]\times 100$$

$$f_{PPE}=[K(T\beta\delta)/T]\times 100$$

$$f_{EEE}=[K(S\gamma\delta)/4T+K(S\delta\delta)/2T]\times 100$$

$$f_{PPP}=[K(T\beta\beta)/T]\times 100$$

$$f_{PEE}=[K(S\beta\gamma)/T]\times 100$$

$$f_{PEP}=[K(S\beta\beta)/T]\times 100$$

In these;

$$T=K(T\delta\delta)+K(T\beta\delta)+K(S\gamma\delta)/4+K(S\delta\delta)/2+K(T\beta\beta)+K(S\beta\delta)+K(S\beta\beta)$$

In these, for example, $f_{EPE}$ indicates the EPE triad fraction (mol %), and K(T δδ) indicates the integrated intensity of the peak for the T δδ carbon.

Next, using the above-mentioned triad fractions, the ethylene unit content (% by weight) is obtained in accordance with the following equation.

Ethylene Unit Content (% by weight)=28 $\{3f_{EEE}+2(f_{PEE}+f_{EPE})+f_{PPE}+f_{PEP}\}\times 100/[28\{3f_{EEE}+2(f_{PEE}+f_{EPE})+f_{PPE}\}+42\{3f_{PPP}+2(f_{PPE}+f_{PEP})+f_{EPE}+f_{PEE}\}]$ If the MI of the insoluble component is smaller than 40 g/10 min, the flowability of the resin is poor and its workability is therefore poor. However, if said MI is larger than 130 g/10 min, the balance of the stiffness, the tensile breaking elongation and the impact resistance of the resin is not good. In view of the flowability, the stiffness and the impact resistance of the resin, the MI of the insoluble component in question is preferably from 50 to 110 g/10 min, more preferably from 50 to 90 g/10 min. The MI of the insoluble component is measured according to JIS K-7210 at a temperature of 230° C. and under a load of 2.16 kg.

If the stereospecificity index of the insoluble component in the resin, as measured through $^{13}$C-NMR, is lower than 98.5%, the stiffness of the resin is poor.

The stereospecificity index is obtained in the manner mentioned below.

The stereospecificity index was calculated by using the peak height of the 6 strong peaks, which were assigned to the mmmm, mmmr, mmrr, (mmrm+rrmr), rrrr and mrrm carbons, in the methyl carbon region of $^{13}$C-NMR spectra of the 25° C. xylene-insoluble component in the resin according to the following equation.

Stereospecificity Index (%)=$L_{mmmm}\times 100/L_{mmmm}+L_{mmmr}+L_{mmrr}+L_{(mmrm+rrmr)}+L_{rrrr}+L_{mrrm})$ wherein $L_{mmmm}$, $L_{mmmr}$, $L_{mmrr}$, $L_{(mmrm+rrmr)}$, $L_{rrrr}$ and $L_{mrrm}$ each are the height of the peak for mmmm, mmmr, mmrr, (mmrm+rrmr), rrrr and mrrm, respectively, from the base line. Of these peaks, the peak for mmmm is composed of a plurality of chemical shifts and scattering peaks each having a different height; while the peak for mmmr is above the tailing of the main peak for mmmm. Therefore, the heights of these two peaks, mmmm and mmmr from the base line shall be corrected in an ordinary manner.

The 25° C. xylene-soluble and insoluble components are isolated from the resin in the manner mentioned below. First, (1) a resin sample is accurately weighed to be 5±0.05 g, and put into a 1000-ml eggplant-type flask, to which is added 1±0.005 g of BHT (antioxidant; 2,6-di-t-butyl-p-cresol). Then, 700±10 ml of paraxylene is added thereto, while a rotator is inserted thereinto. Next, (2) a condenser is fixed to the flask, and the flask is heated in an oil bath at 140±5° C. for 120±30 minutes, while the rotator is moved, whereby the sample is dissolved in paraxylene.

Next, (3) the solution formed in the flask is transferred into a 1000-ml beaker, and this is spontaneously cooled to room temperature (25° C.) over a period of 8 hours or longer, while being stirred with a stirrer. Then, the precipitate formed is removed through filtration using wire gauze. (4) The resulting filtrate is further filtered through filter paper, and the thus-obtained filtrate is poured into 2000±200 ml of methanol in a 3000-ml beaker. This is stirred at room temperature (25° C.) with a stirrer over a period of 2 hours or longer. Next, (5) the precipitate formed is taken out through filtration using wire gauze, then dried in air for 5 hours or longer, and thereafter further dried in a vacuum drier at 100±5° C. for 240 to 270 minutes to collect the component that is soluble in xylene at 25° C.

On the other hand, (6) the precipitate as separated to remain on the wire gauze in the above-mentioned step (3) is again subjected to the steps (1) and (2) whereby it is dissolved in paraxylene. Immediately while hot, the resulting solution is put into 2000±100 ml of methanol in a 3000-ml beaker, stirred with a stirrer over a period of 2 hours or longer, and then statistically left at room temperature (25° C.) overnight. Next, (7) the resulting precipitate is taken out through filtration using wire gauze, then dried in air for 5 hours or longer, and thereafter again dried in a vacuum drier at 100±5° C. for 240 to 270 minutes to collect the component that is insoluble in xylene at 25° C.

The 25° C. xylene-soluble content, x, of the resin sample is represented by the following equation in which A indicates the weight (g) of the sample and C indicates the weight (g) of the soluble component collected in the above-mentioned step (5).

$$x(\% \text{ by weight})=100\times C/A$$

The insoluble content of the resin sample is represented by (100 −x)% by weight.

The method for producing the polypropylene-based resin of the present invention is not specifically defined, provided that it produces the polypropylene-based resin of the invention that satisfies the above-mentioned requirements. Any desired methods are employable herein for producing the intended resin. For example, employable are a method of stepwise polymerizing propylene, preferably in two steps, using a polymerization catalyst that catalyzes the polymerization to give isotactic polypropylene, in a predetermined ratio of the components, while the polymerization condition is suitably controlled to give a polypropylene mixture, followed by mixing the resulting polypropylene mixture with a propylene/ethylene copolymer; and a method of stepwise polymerizing propylene in the same manner as in the above-mentioned method to give a polypropylene mixture, followed by copolymerizing propylene and ethylene in the presence of the resulting polypropylene mixture. In these, the stepwise-varying polymerization may be effected either batchwise or continuously. If desired, the polymerization condition may be so controlled that polypropylene having a higher molecular weight is first prepared and thereafter polypropylene having a lower molecular weight is then prepared, thereby obtaining a polypropylene mixture comprising the two in a predetermined ratio; or on the contrary, polypropylene having a lower molecular weight is first prepared and thereafter polypropylene having a higher molecular weight is then prepared, thereby obtaining a polypropylene mixture comprising the two in a predetermined ratio.

The polymerization mode is not specifically defined, and any of slurry polymerization, vapor phase polymerization, bulk polymerization, suspension polymerization, solution polymerization or the like is employable.

Regarding the polymerization condition, the temperature may be generally between 0° C. and 100° C., preferably between 30 and 90° C. in each stage, and the pressure may be generally between atmospheric pressure and 45 kg/cm$^2$G, preferably between 1 and 40 kg/cm$^2$G in each stage. In each stage, the molecular weight of the polymer to be formed may be controlled by any ordinary means, for example, by suitably adjusting the hydrogen concentration in the polymerizer.

The polymerization catalyst to be employed for giving isotactic polypropylene in the production of the polypropylene-based resin of the present invention may be any known one. Preferably, for example, the catalyst for use in the invention comprises (W) a solid component comprising (a) a solid catalyst component comprising magnesium, titanium, a halogen atom and an electron donor, and optionally (b) a crystalline polyolefin, (X) an organoaluminum compound, and (Y) an ordinary electron donor compound.

The solid component (W) comprises the component (a) of a solid catalyst component comprising magnesium, titanium, a halogen atom and an electron donor, and the optional component (b) of a crystalline polyolefin. The solid catalyst component of said component (a) indispensably comprises magnesium, titanium, a halogen atom and an electron donor, and can be prepared, for example, by contacting a magnesium compound, a titanium compound and an electron donor. In this case, the magnesium compound and/or the titanium compound contain a halogen atom in the form of a halide.

The magnesium compound includes, for example, magnesium dihalides such as magnesium dichloride; magnesium oxide, magnesium hydroxide, hydrotalcite, magnesium carboxylates; dialkoxy magnesiums such as diethoxy magnesium; diaryloxy magnesiums, alkoxy magnesium halides, aryloxy magnesium halides; dialkyl magnesiums such as ethylbutyl magnesium; alkyl magnesium halides; and reaction products of organomagnesium compounds with electron donors, halosilanes, alkoxysilanes, silanols and aluminum compounds. Of these, preferred are magnesium dihalides, dialkoxy magnesiums, dialkyl magnesiums, and alkyl magnesium halides. These magnesium compounds can be used singly or as combined.

The magnesium compound also includes reaction products of metallic magnesium with halogens and/or halogen-containing compounds, and alcohols. The metallic magnesium is not specifically defined, but may be a particulate metallic magnesium having any desired particle size, including, for example, granular, ribbon-shaped or powdery ones. The surface condition of the metallic magnesium is not also specifically defined. Preferably, however, the metallic magnesium is not coated with a film of magnesium oxide or the like.

The alcohol may be any desire done, but preferred are lower alcohols having from 1 to 6 carbon atoms. Especially preferred is ethanol, as giving a solid catalyst component having an extremely improved catalytic activity. The purity and the water content of the alcohol are not also specifically defined. However, alcohols having a high water content are undesirable, as forming a magnesium hydroxide film on the surface of metallic magnesium. The water content of the alcohol is preferably not larger than 1% by weight, more preferably not larger than 2000 ppm. It is advantageous that the water content of the alcohol is smaller.

The halogens and/or halogen-containing compounds are not specifically defined. For the latter, employable is any compound containing a halogen atom in its molecule. In this, the halogen atom is not specifically defined, but is preferably chlorine, bromine or iodine. Especially preferred is iodine. The halogen-containing compounds are especially preferably halogen-containing metal compounds. The compounds are not specifically defined with respect to their condition, shape and particle size. They may be in any desired condition while having any desired shape and particle size. For example, they may be in the form of solutions in alcoholic solvents (e.g., ethanol).

The amount of the alcohol is not specifically defined; however, it usually ranges from 2 to 100 mols, preferably from 5 to 50 mols, per mol of the metallic magnesium. Use of an excess amount of alcohol may give a reduced yield of a magnesium compound having a good morphology. With too small amount of alcohol, it is often difficult to carry out smooth reaction of alcohol and metallic magnesium.

The halogen and/or halogen-containing compound are used generally in an amount of not smaller than 0.0001 gram-atoms, preferably not smaller than 0.0005 gram-atoms, more preferably not smaller than 0.001 gram-atoms, in terms of the halogen atom, per gram-atom of the metallic magnesium. The use of the halogen and/or halogen-containing compound smaller than 0.0001 gram-atoms is unfavorable for the following reasons. When the magnesium compound obtained is directly used without being ground, the amount of titanium to be carried by the catalyst is lowered, and the activity of the catalyst itself is lowered. In addition, the stereospecificity of the polymer produced is lowered, and the morphology of the polymer produced is often bad. Therefore, it is inevitable to grind the magnesium compound obtained before it is used. The amount of the halogen and/or halogen-containing compound to be used may be suitably selected, whereby the particle size of the magnesium compound obtained can be controlled to be any desired one.

The reaction between the metallic magnesium and the halogen and/or halogen-containing compound may be effected in any per-se known manner. For example, metallic magnesium, an alcohol and a halogen and/or halogen-containing compound are reacted under refluxing conditions until the reaction system does not evolve hydrogen gas anymore, for example, usually for approximately from 20 to 30 hours, to obtain the intended magnesium compound. Concretely, where iodine is used as the halogen, metallic magnesium and a solid iodine are put into an alcohol and heated under reflux; or an alcoholic solution of metallic magnesium and iodine is dropped into an alcohol and then heated under reflux; or an alcoholic solution of iodine is dropped into an alcoholic solution of metallic magnesium while heating the latter. Preferably, these methods are carried out in an inert gas atmosphere of, for example, nitrogen gas, argon gas or the like, optionally using an inert organic solvent (for example, saturated hydrocarbons such as n-hexane). It is not always necessary to place the metallic magnesium, alcohol, and halogen and/or halogen-containing compound all at once in the reaction vessel prior to the start of the reaction of these. It is possible to place them by portions in the reaction vessel even after the start of the reaction.

Where the magnesium compound obtained in that manner is used to prepare a solid catalyst component, it may be dried, or, after having been taken out through filtration, it may be washed with an insert solvent such as heptane or the like. In any case, the magnesium compound obtained can be used in the next step of preparing the solid catalyst component, without being ground or classified to dress the particles of the compound.

The titanium compound includes, for example, tetraalkoxy titaniums such as tetramethoxy titanium, tetraethoxy titanium, tetra-n-propoxy titanium, tetraiso-propoxy titanium, tetra-n-butoxy titanium, tetraisobutoxy titanium, tetracyclohexyloxy titanium, tetraphenoxy titanium, etc.; titanium tetrahalides such as titanium tetrachloride, titanium tetrabromide, titanium tetraiodide, etc.; monoalkoxy titanium trihalides such as methoxy titanium trichloride, ethoxy titanium trichloride, propoxy titanium trichloride, n-butoxy titanium trichloride, ethoxy titanium tribromide, etc.; dialkoxy titanium dihalides such as dimethoxy titanium dichloride, diethoxy titanium dichloride, dipropoxy titanium dichloride, di-n-butoxy titanium dichloride, diethoxy titanium dibromide, etc.; and trialkoxy titanium monohalides such as trimethoxy titanium chloride, triethoxy titanium chloride, tripropoxy titanium chloride, tri-n-butoxy titanium chloride, etc. Of these, preferred are halogen-rich titanium compounds, and especially preferred is titanium tetrachloride. These titanium compounds can be used singly or as combined.

As examples of the electron donor, referred to are the examples of the electron donor compound of the component (Y) to be mentioned hereinunder.

To prepare the solid catalyst component (a), employable are any known methods, such as those described in JP-A-43094/1978, JP-A-135102/1980, JP-A-135103/1980, JP-A-18606/1981, JP-A-166205/1981, JP-A-63309/1982, JP-A-190004/1982, JP-A-300407/1982 and JP-A-47003/1983.

In the composition of the solid catalyst component (a) prepared in that manner, in general, the atomic ratio of magnesium/titanium is from 2 to 100, that of halogen/titanium is from 5 to 100, and the molar ratio of electron donor/titanium is from 0.1 to 10.

The crystalline polyolefin of the component (b) which is optionally used in preparing the solid component (W) may be one to be obtained from α-olefins having from 2 to 10 carbon atoms, including, for example, polyethylene, polypropylene, polybutene-1, poly-4-methyl-1-pentene, etc. The crystalline polyolefin can be prepared by (1) pre-polymerizing propylene in the presence of a combination of the above-mentioned solid catalyst component (a), an organoaluminum compound and optionally an electron donor compound (pre-polymerization method); or (2) dispersing the above-mentioned solid catalyst component (a) and optionally an organoaluminum compound and an electron donor compound (having a melting point of not lower than 100° C.) in a crystalline powder of crystalline polyethylene or polypropylene having a uniform particle size (dispersion method); or (3) combining the above-mentioned methods (1) and (2).

In the pre-polymerization method (1), the atomic ratio of aluminum/titanium is generally from 0.1 to 100, preferably from 0.5 to 5; and the molar ratio of electron donor compound/titanium is generally from 0 to 50, preferably from 0.1 to 2. The temperature for the pre-polymerization may fall between 0° C. and 90° C., preferably between 5 and 60° C.

The ratio of the crystalline polyolefin (b) to the solid catalyst component (a) in the solid component (W) may be generally from 0.03 to 200, preferably from 0.10 to 50, in terms of the ratio by weight of (b)/(a).

The aluminum compound to be used as the component (X) may be represented by a general formula:

$AlR^1_p X_{3-p}$ wherein $R^1$ indicates an alkyl group having from 2 to 20 carbon atoms, or an aryl group having from 6 to 20 carbon atoms; X indicates a halogen atom; and p indicates a number of from 1 to 3.

For example, preferred are trialkylaluminums such as triethylaluminum, triisopropylaluminum, triisobutylaluminum, trioctylaluminum, etc.; dialkylaluminum monohalides such as diethylaluminum monochloride, diisopropylaluminum monochloride, diisobutylaluminum monochloride, dioctylaluminum monochloride, etc.; and alkylaluminum sesquihalides such as ethylaluminum sesquichloride, etc. These aluminum compounds can be used singly or as combined.

The polymerization catalyst generally comprises the component (Y) of an electron donor compound. The electron donor compound is a compound containing any of oxygen, nitrogen, phosphorus, sulfur and silicon. Basically, the compound will have the property of improving the stereospecificity in the polymerization of propylene.

The electron donor compound includes, for example, organosilicon compounds, esters, thioesters, amines, ketones, nitriles, phosphines, ethers, thioethers, acid anhydrides, acid halides, acid amides, aldehydes, organic acids, azo compounds, etc.

As examples of the electron donor compound, mentioned are organosilicon compounds such as diphenyldimethoxysilane, diphenyldiethoxysilane, cyclohexylmethyldimethoxysilane, di-cyclopentyldimethoxysilane, diisopropyldimethoxysilane, t-butyl-n-propyldimethoxysilane, dibenzyldimethoxysilane, tetramethoxysilane, tetraethoxysilane, tetraphenoxysilane, methyltrimethoxysilane, methyltriethoxysilane, methyltriphenoxysilane, phenyltrimethoxysilane, phenyltriethoxysilane, benzyltrimethoxysilane, etc.; esters of aromatic dicarboxylic acids such as monomethyl phthalate, monoethyl phthalate, monopropyl phthalate, monobutyl phthalate, monoisobutyl phthalate, monoamyl phthalate, monoisoamyl phthalate, monomethyl terephthalate, monoethyl terephthalate, monopropyl terephthalate, monobutyl terephthalate, monoisobutyl terephthalate, dimethyl phthalate, diethyl phthalate, dipropyl phthalate, dibutyl phthalate, diisobutyl phthalate, diamyl phthalate, diisoamyl phthalate, methyl ethyl phthalate, methyl isobutyl phthalate, methyl propyl phthalate, ethyl butyl phthalate, ethyl isobutyl phthalate, ethyl propyl phthalate, propyl isobutyl phthalate, dimethyl terephthalate, diethyl terephthalate, dipropyl terephthalate, diisobutyl terephthalate, methyl ethyl terephthalate, methyl isobutyl terephthalate, methyl propyl terephthalate, ethyl butyl terephthalate, ethyl isobutyl terephthalate, ethyl propyl terephthalate, propyl isobutyl terephthalate, dimethyl isophthalate, diethyl isophthalate, dipropyl isophthalate, diisohutyl isophthalate, methyl ethyl isophthalate, methyl isobutyl isophthalate, methyl propyl isophthalate, ethyl butyl isophthalate, ethyl isobutyl isophthalate, ethyl propyl isophthalate, propyl isobutyl isophthalate, etc.; monoesters such as methyl formate, ethyl formate, methyl acetate, ethyl acetate, vinyl acetate, propyl acetate, octyl acetate, cyclohexyl acetate, ethyl propionate, methyl butyrate, ethyl butyrate, ethyl valerate, methyl chloroacetate, ethyl dichloroacetate, methyl methacrylate, ethyl crotonate, ethyl pivalate, dimethyl maleate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, ethyl p-butoxybenzoate, ethyl o-chlorobenzoate, ethyl naphthoate, etc.; γ-butyrolactone, δ-valerolactone, coumarin, phthalide; esters such as ethylene carbonate, etc.; organic acids such as benzoic acid, p-hydroxybenzoic acid, etc.; acid anhydrides such as succinic anhydride, benzoic anhydride, p-toluic anhydride, etc.; ketones such as acetone, methyl ethyl ketone, methyl isobutyl ketone, acetophenone, benzophenone, benzoquinone, etc.; aldehydes such as acetaldehyde, propionaldehyde, octyl aldehyde, tolualdehyde, benzaldehyde, naphthyl aldehyde, etc.; acid halides such as acetyl chloride, acetyl bromide, propionyl chloride, butyryl chloride, isobutyryl chloride, 2-methylpropionyl chloride, valeryl chloride, isovaleryl chloride, hexanoyl chloride, methylhexanoyl chloride, 2-ethylhexanoyl chloride, octanoyl chloride, decanoyl chloride, undecanoyl chloride, hexadecanoyl chloride, octadecanoyl chloride, benzylcarbonyl chloride, cyclohexanecarbonyl chloride, malonyl dichloride, succinyl dichloride, pentanedioleyl dichloride, hexanedioleyl dichloride, cyclohexanedicarbonyl dichloride, benzoyl chloride, benzoyl bromide, methylbenzoyl chloride, phthaloyl chloride, isophthaloyl chloride, terephthaloyl chloride, benzene-1,2,4-tricarbonyl trichloride, etc.; ethers such as methyl ether, ethyl ether, isopropyl ether, n-butyl ether, isopropyl methyl ether, isopropyl ethyl ether, t-butyl ethyl ether, t-butyl n-propyl ether, t-butyl n-butyl ether, t-amyl methyl ether, t-amyl ethyl ether, amyl ether, tetrahydrofuran, anisol, diphenyl ether, ethylene glycol butyl ether, etc.; acid amides such as acetic acid amide, benzoic acid amide, toluic acid amide, etc.; amines such as tributylamine, N,N'-dimethylpiperazine, tribenzylamine, aniline, pyridine, pyrroline, tetramethylethylenediamine, etc.; nitriles such as acetonitrile, benzonitrile, tolunitrile, etc.; and azo compounds having a substituent with steric hindrance as bonded to the azo bond, such as 2,2'-azobis(2-methylpropane), 2,2'-azobis(2-ethylpropane), 2,2'-azobis(2-methylpentane), etc.

Of these, preferred are organosilicon compounds, esters, ketones, ethers, thioethers, acid anhydrides, and acid halides. Especially preferred are organosilicon compounds such as diphenyldimethoxysilane, cyclohexylmethyldimethoxysilane, dicyclopentyldimethoxysilane, t-butyl-n-propyldimethoxysilane, etc.; aromatic dicarboxylates such as di-n-butyl phthalate, diisobutyl phthalate, etc.; and alkyl esters of aromatic monocarboxylic acids such as benzoic acid, p-methoxybenzoic acid, p-ethoxybenzoic acid, toluic acid, etc. These electron donor compounds can be used singly or as combined.

Regarding the amounts of the components constituting the catalyst system to be used in polymerization of propylene, the solid component (W) may be generally from 0.0005 to 1 mmol, in terms of the titanium atom in said component, per liter of the reaction medium for slurry polymerization; and the organoaluminum compound (X) may be such that the atomic ratio of aluminum/titanium is generally from 1 to 3000, preferably from 40 to 800. If the amounts of said constituent components overstep the defined ranges, the activity of the catalyst is often poor.

Now, the polypropylene-based resin composition of the present invention is described hereinunder.

The polypropylene-based resin composition (I) of the invention comprises (A) from 45 to 90% by weight of the above-mentioned polypropylene-based resin of the invention, (B) from 5 to 50% by weight of a copolymer mainly composed of ethylene and/or α-olefins having 3 or more carbon atoms, and (C) from 0 to 25% by weight of talc.

The component (B) of a copolymer mainly composed of ethylene and/or α-olefins having 3 or more carbon atoms includes, for example, copolymers of ethylene-α-olefins with 3 or more carbon atoms (e.g., ethylene-propylene copolymers, ethylene-butene copolymers, ethylene-octene copolymers, etc.); hydrogenated styrene-diene copolymers (e.g., hydrogenated styrene-butadiene copolymers, hydrogenated styrene-isoprene copolymers, etc.); and hydrogenated diene (co)polymers (e.g., hydrogenated 1,2-butadiene-1,4-butadiene copolymers, hydrogenated butadiene-isoprene copolymers, etc.) Of such copolymers, preferred are those having a styrene unit content of from 10 to 35% by weight, and also ethylene-butene-1 copolymers and ethylene-octene-1 copolymers. For the ethylene-butene-1 copolymers, especially preferred are those to be used as the component (B') in the polypropylene-based resin composition which will be mentioned hereinunder, in view of the properties of the polypropylene-based resin composition (II) comprising the copolymer. The copolymers of the component (B) can be used singly or as combined.

The particle size of the talc to be used as the component (C) is not specifically defined, but is preferably from 0.5 to 3 μm from the viewpoint of the impact resistance of the resin composition. The talc can be surface-treated with a silane coupling agent or the like.

If the content of the polypropylene-based resin of the component (A) oversteps the above-defined range, a resin composition having well-balanced workability, stiffness, tensile breaking elongation, impact resistance and outward appearance is difficult to obtain. From the viewpoint of the balance of these properties of the composition, the content of the component (A) is preferably from 50 to 80% by weight, more preferably from 55 to 75% by weight, even more preferably from 58 to 70% by weight. If the content of the copolymer of the component (B) is smaller than 5% by weight, the component (B) could not satisfactorily exhibit its effect to improve the impact resistance and the tensile breaking elongation of the resin composition. If, however, it is larger than 50% by weight, the stiffness and the flowability of the resin composition are poor. From the viewpoint of the impact resistance and the stiffness of the resin composition, the content of the component (B) is preferably from 10 to 40% by weight, more preferably from 10 to 20% by weight, even more preferably from 13 to 19% by weight. The component (C) of talc is an optional one, and it is not always necessary in the resin composition. However, it is desirable to add the component (C) of talc to the resin composition of the invention in order to improve the stiffness of the composition. However, if the content of the component (C), talc is larger than 25% by weight, the impact resistance and the shapability of the resin composition are poor. From the viewpoint of the stiffness, the impact resistance, the tensile breaking elongation and the shapability of the resin composition, the content of the component (C) is preferably from 5 to 25% by weight, more preferably from 15 to 25% by weight, even more preferably from 17 to 23% by weight.

The present invention also provides a polypropylene-based resin composition (II) comprising (A') from 45 to 90% by weight of a polypropylene-based resin, (B') from 5 to 50% by weight of an ethylene-butene-1 copolymer having specific properties as mentioned below, and (C) from 0 to 25% by weight of talc.

As the polypropylene-based resin of the component (A'), preferred is a crystalline polypropylene-based resin. Especially preferred is a block copolymer comprising a homopolymer moiety of a propylene homopolymer having an isotactic structure and a copolymer moiety of an ethylene-propylene random copolymer, and having a melt index (MI) of from 30 to 100 g/10 min, of which the copolymer content is from 3 to 20% by weight and in which the ethylene unit content of the copolymer moiety is from 20 to 35% by weight. The copolymer content of the block copolymer can be obtained as the 25° C. xylene-soluble content of the copolymer, in the same manner as mentioned hereinabove for the measurement of the 25° C. xylene-soluble content, x, of the polypropylene-based resin. The ethylene unit content of said copolymer moiety can be obtained in the same manner as mentioned hereinabove for the measurement of the ethylene unit content, z, of the 25° C. xylene-soluble component in said resin.

Of the above-mentioned block copolymer, if the copolymer content is smaller than 3% by weight, the impact resistance of the resin composition comprising the copolymer will be poor. If, however, the copolymer content is larger than 20% by weight, the component (B') added to the resin composition will poorly exhibit its effect. If the ethylene unit content of the copolymer moiety in the block copolymer is smaller than 20% by weight, the impact resistance of the resin composition comprising the copolymer will be poor. If, however, the ethylene unit content in question is larger than 35% by weight, the elongation of the resin composition comprising the copolymer will be poor. If the MI of the block copolymer is smaller than 30 g/10 min, the shapability of the resin composition comprising the copolymer is poor; but if it is larger than 100 g/10 min, the kneading workability of the resin composition comprising the copolymer is unfavorably poor. From the viewpoint of shapability and kneading workability of the resin composition, the MI of the copolymer is preferably from 40 to 70 g/10 min. The MI of the copolymer is measured according to JIS K-7210, at a temperature of 230° C. and under a load of 2.16 kg.

The production of the polypropylene-based resin of the component (A') is not specifically defined. To produce the resin, employable is any desired method that may be selected from known methods.

The ethylene-butene-1 copolymer of the component (B') is one having a butene-1 unit content of from 10 to 25 mol %, a melt index of from 0.5 to 10 g/10 min, a peak melting point of from 20 to 50° C., a quantity of heat for crystallization of from 20 to 50 J/g, and a ratio of the quantity of heat (J/g) to the butene-1 unit content (mol %) of not smaller than 1.4.

The butene-1 unit content of the copolymer is obtained according to the method of measurement of butene-1 unit content through $^{13}$C-NMR which is described in *Journal of Applied Polymer Science*, Vol. 42, pp. 399–408, 1991. The peak melting point and the quantity of heat for crystallization of the copolymer are obtained through differential scanning calorimetry (DSC), according to the method mentioned below. A sample is put into a DSC device, heated from 50° C. to 230° C., then kept at 230° C. for 3 minutes, and thereafter cooled to −50° C. at a cooling rate of 10° C./min, whereupon the quantity of heat as generated by the sample is measured to be the quantity of heat for crystallization of the sample. After having been cooled to −50° C., the sample is kept at −50° C. for 5 minutes, and thereafter heated at a heating rate of 10° C./min, whereupon the peak temperature at which the sample is melted is measured to be the peak melting point of the sample.

If the butene-1 unit content of the copolymer is smaller than 10 mol %, the copolymer could not satisfactorily exhibit its effect to improve the low-temperature impact resistance of the resin composition; but if it is larger than 25 mol %, the copolymer is difficult to handle in producing the resin composition. Considering the effect of the copolymer to improve the low-temperature impact resistance of the resin composition and also the handlability of the copolymer, the butene-1 unit content of the copolymer is preferably from 15 to 20 mol %, more preferably from 16 to 19 mol %. If the MI of the copolymer is smaller than 0.5 g/10 min, it is difficult to knead the copolymer with the polypropylene-based resin of the component (A'); but if it is larger than 10 g/10 min, the copolymer could not satisfactorily exhibit its effect to improve the impact resistance of the resin composition. Considering the kneadability of the copolymer with the component (A') and also the effect of the copolymer to improve the impact resistance of the resin composition, the MI of the copolymer is preferably from 1 to 5 g/10 min, more preferably from 2 to 3 g/10 min. The MI of the copolymer is measured according to JIS K-7210 at a temperature of 230° C. and under a load of 2.16 kg.

If the peak melting point of the copolymer is lower than 20° C., the elasticity of the resin composition comprising the copolymer is poor; but if it is higher than 50° C., the copolymer could not satisfactorily exhibit its effect to improve the impact resistance of the resin composition. Considering the elasticity of the resin composition and also the effect of the copolymer to improve the impact resistance of the resin composition, the peak melting point of the copolymer is preferably from 25 to 45° C., more preferably from 30 to 40° C. If the quantity of heat for crystallization of the copolymer is smaller than 20 J/g, the elasticity of the resin composition comprising the copolymer is poor; but if it is larger than 50 J/g, the copolymer could not satisfactorily exhibit its effect to improve the impact resistance of the resin composition. Considering the elasticity of the resin composition and also the effect of the copolymer to improve the impact resistance of the resin composition, the quantity of heat for crystallization of the copolymer is preferably from 25 to 45 J/g, more preferably from 30 to 40 J/g. If the ratio of the quantity of heat for crystallization of the copolymer (J/g) to the butene-1 unit content of the copolymer (mol %) is smaller than 1.4, the stiffness of the resin composition comprising the copolymer is low. From the viewpoint of the stiffness of the resin composition, the ratio of the quantity of heat for crystallization of the copolymer to the butene-1 unit content of the copolymer is preferably not smaller than 1.6, more preferably not smaller than 1.8.

The method of producing the ethylene-butene-1 copolymer of the component (B') is not specifically defined, provided that it produces the intended copolymer having the specifically-defined properties. For example, a solution process, a vapor phase fluidized bed process or the like is employable to produce the copolymer, while using a Ziegler catalyst or a metallocene catalyst.

For the talc of the optional component (C) in the resin composition (II), referred to is the talc to be optionally in the above-mentioned resin composition (I).

If the content of the polypropylene-based resin of the component (A') in the composition (II) is smaller than 45% by weight, the stiffness of the composition is low so that the composition is not applicable to the production of car parts. If, however, said content is larger than 90% by weight, the impact resistance of the resin composition is low. In view of the balance of the stiffness and the impact resistance of the resin composition, the content of the component (A') is preferably from 50 to 80% by weight, more preferably from 55 to 70% by weight.

If the content of the ethylene-butene-1 copolymer of the component (B') is smaller than 5% by weight, the copolymer could not satisfactorily exhibit its effect to improve the impact resistance of the resin composition; but if it is larger than 50% by weight, the stiffness of the resin composition is low so that the composition is not applicable to the production of car parts. In view of the balance of the impact resistance and the stiffness of the resin composition, the content of the component (B') is preferably from 20 to 40% by weight, more preferably from 25 to 35% by weight.

The component (C) of talc is an optional one, and it is not always necessary in the resin composition (II). However, it is desirable to add the component (C) of talc to the resin composition (II) in order to improve the stiffness of the composition. However, if the content of the component (C), talc is larger than 25% by weight, the impact resistance and the shapability of the resin composition are poor. From the viewpoint of the stiffness, the impact resistance and the shapability of the resin composition, the content of the component (C) is preferably from 3 to 15% by weight, more preferably from 5 to 10% by weight.

The polypropylene-based resin compositions (I) and (II) of the present invention may additionally contain, if desired, any known additives such as reinforcing agents, fillers, pigments, nucleating agents, weather-resisting agents, antioxidants, antistatic agents, flame retardants, dispersing agents, etc., only within the ranges not interfering with the effects of the present invention.

The method of producing the polypropylene-based resin compositions (I) and (II) of the present invention is not specifically defined. For example, the above-mentioned components (A), (B) and (C), or (A'), (B') and (C), and optionally any other additives are melted and kneaded, using a single-screw extruder, a double-screw extruder, a Banbury mixer, a kneader, a roll mixer or the like.

Now, the present invention is described in more detail with reference to the following Examples, which, however, are not intended to restrict the scope of the invention.

The properties of the polypropylene-based resin samples prepared in these Examples were measured according to the methods mentioned hereinabove.

EXAMPLE 1

(1) Preparation of Magnesium Compound

A glass reactor (inner volume: about 6 liters) equipped with a stirrer, which had been sufficiently purged with nitrogen gas, was charged with about 2430 g of ethanol (special class grade chemical, manufactured by Wako Pure Chemical Industries, Ltd.), 16 g of iodine (special class grade chemical, manufactured by Wako Pure Chemical Industries, Ltd.) and 160 g of particulate metallic magnesium having a mean particle size of 350 µm. These were reacted under heat with stirring under refluxing conditions until no hydrogen gas was evolved any longer to give a solid product. There action mixture containing the solid product was dried under reduced pressure to obtain a magnesium compound (solid product).

(2) Preparation of Solid Catalyst Component

A three-neck glass flask (inner volume: 500 ml), which had been sufficiently purged with nitrogen gas, was charged with 16 g of the magnesium compound obtained in the previous step (1), 80 ml of pure n-heptane, 2.4 ml of silicon tetrachloride and 2.3 ml of diethyl phthalate. Next, 77 ml of titanium tetrachloride was put into the flask with stirring, while the reaction system was kept at 90° C., and these were reacted at 110° C. for 2 hours. The supernatant was removed from the reaction mixture, and the residue was sufficiently washed with pure n-heptane. Next, 122 ml of titanium tetrachloride was added to this and reacted at 110° C. for 2 hours. Then, the reaction product was sufficiently washed with pure n-heptane to obtain a solid catalyst component.

(3) Pre-polymerization

A 5-liter, three-neck glass flask equipped with a stirrer and a thermometer was charged with 4 liters of n-heptane, which had been dewatered with Molecular Sieves 4A and with nitrogen bubbling, in a nitrogen stream. Next, 26.8 ml of triethylaluminum (TEA), 2.5 ml of dicyclopentyldimethoxysilane (DCPDMS), and 5.3 mmols, in terms of Ti atom, of the solid catalyst component prepared above (that is, 3.8 g of the solid catalyst component) were put into said flask in that order, with stirring at room temperature (25° C.).

Next, still with stirring, propylene was continuously put into the flask at room temperature to give 0.3 times, relative to the weight of the solid catalyst, of polypropylene. Thus was prepared herein a pre-polymerization catalyst.

(4) Propylene Homopolymerization

A 10-liter pressure autoclave, which had been well purged with nitrogen and dried, was charged with 6 liters of n-heptane, which had been well dewatered with Molecular Sieves, in a nitrogen stream. Next, 7.5 mmols of triethylaluminum (TEA) and 0.5 mmols of dicyclopentyldimethoxysilane (DCPDMS) were put into the autoclave, which was then purged with propylene at 80° C. to remove the nitrogen gas. Next, 3.2 kg/cm$^2$G (as measured with a precision gauge meter) of hydrogen was introduced into the autoclave, and then propylene was introduced thereinto with stirring to give a final propylene pressure of 8.0 kg/cm$^2$G.

Next, 0.05 mmols, in terms of Ti atom, of the pre-polymerization catalyst as prepared in the previous step (3) was put into the autoclave, and then propylene was continuously introduced thereinto to keep a constant propylene pressure of 8.0 kg/cm$^2$G, and polymerized therein at 80° C. After the polymerization was continued for 2 hours, the autoclave was degassed to have an atmospheric pressure.

Next, the autoclave was purged with propylene, then 0.2 kg/cm$^2$ of hydrogen was introduced thereinto, and thereafter propylene was continuously introduced thereinto to give an elevated propylene partial pressure of 5.5 kg/cm$^2$ at 80° C., and polymerized for 40 minutes. After the polymerization, the autoclave was degassed to have an atmospheric pressure. In this homopolymerization process, the ratio by weight of the first stage reaction to the second stage reaction was obtained from the data of the flow integrator used.

(5) Propylene-Ethylene Copolymerization

Next, the autoclave was purged with propylene, then 0.3 kg/cm$^2$ of hydrogen was introduced thereinto, and thereafter ethylene and propylene were continuously introduced thereinto at a flow rate, ethylene/propylene, of 1.6/1.0 (NLM/NLM), and polymerized at 57° C. for 40 minutes. (NLM as referred to herein indicates normal liters per minute.) Next, the autoclave was degassed to have an atmospheric pressure, and the polymer powder containing n-heptane was separated at 57° C., using 400-mesh, stainless wire gauze. This was washed with 4 liters of n-heptane at 57° C. with stirring for 30 minutes, and again filtered through 400-mesh, stainless wire gauze to separate the polymer powder. After having been dried, obtained was a polymer of a final product.

The polymerization conditions are shown in Table 1 below, and the physical properties of the polypropylene-based resin obtained are shown in Table 2 below.

(6) Preparation of Polypropylene-based Resin Composition 100 parts by weight of the polypropylene-based resin powder as obtained in the previous step (5) was well mixed with 0.15 parts by weight of an antioxidant, Irganox 1010 (tradename) (tetrakis[methylene-3-(3',5'-di-t-butyl-4'-hydroxyphenyl)propionate]methane), 0.075 parts by weight of an antioxidant, P-EPQ (trade name) (tetrakis(2,4-di-t-butylphenyl)-4,4'-biphenylenephosphonite) and 0.2 parts by weight of a nucleating agent, NA-11 (trade name) (sodium 2,2'-methylenebis(4,6-di-t-butylphenyl)phosphate), and then melt-kneaded and granulated through a double-screw extruder (TEX35, manufactured by The Japan Steel Works, Ltd.). Next, the granular polypropylene-based resin was mixed with the elastomer and talc shown in Table 3 below in the ratio also shown in Table 3, and then melt-kneaded and granulated through the double-screw extruder. Next, the granules of the polypropylene-based resin composition was molded, using an injection molding machine, to form predetermined test pieces.

These test pieces were subjected to ASTM tests to measure the modulus of bending elasticity, the Izod impact strength, the tensile breaking elongation and the MI thereof. The data obtained are shown in Table 3.

EXAMPLES 2 TO 10 AND COMPARATIVE EXAMPLES 1 TO 10

Various polypropylene-based resins were produced in the same manner as in Example 1, except that the polymerization conditions were changed to those shown in Table 1. The physical data of the resins obtained are shown in Table 2.

Next, the resins each were mixed with the components shown in Table 3, in the same manner as in Example 1, to prepare polypropylene-based resin compositions. These compositions were separately molded, using an injection molding machine, to form test pieces, of which the physical properties were measured. The data obtained are shown in Table 3.

In Comparative Examples 5 and 9, the organosilicon compound used for the polymerization was different from that used in the others, but the other polymerization conditions employed were similar to those in the others.

TABLE 1

| | | | Example | | | | |
|---|---|---|---|---|---|---|---|
| | | | 1 | 2 | 3 | 4 | 5 |
| Homo-polymerization | Ti (mmols) | | 0.05 | 0.05 | 0.05 | 0.05 | 0.05 |
| | TEA (mmols) | | 7.5 | 7.5 | 7.5 | 7.5 | 7.5 |
| | Organosilicon Compound | Type | DCPDMS | DCPDMS | DCPDMS | DCPDMS | DCPDMS |
| | | Si (mmols) | 0.5 | 0.6 | 0.6 | 0.5 | 0.5 |
| | 1st stage | Temperature (° C.) | 80 | 80 | 80 | 80 | 80 |
| | | Propylene Partial Pressure (kg/cm$^2$) | 6.5 | 6.5 | 6.5 | 6.5 | 6.5 |
| | | Hydrogen Partial Pressure (kg/cm$^2$) | 3.2 | 3.8 | 3.2 | 3.2 | 3.2 |
| | | Time (min) | 120 | 120 | 120 | 120 | 120 |
| | 2nd stage | Temperature (° C.) | 80 | 80 | 80 | 80 | 80 |
| | | Propylene Partial Pressure (kg/cm$^2$) | 5.5 | 5.5 | 5.5 | 5.5 | 5.5 |
| | | Hydrogen Partial Pressure (kg/cm$^2$) | 0.2 | 0.2 | 0.2 | 0.2 | 0.2 |
| | | Time (min) | 40 | 50 | 40 | 40 | 40 |
| | (2nd stage)/(1st stage + 2nd stage)* | | 11.2 | 14.7 | 11.2 | 11.2 | 11.2 |
| Co-polymerization | Hydrogen Partial Pressure (kg/cm$^2$) | | 0.30 | 0.35 | 0.34 | 0.33 | 0.35 |
| | Time (min) | | 40 | 40 | 40 | 40 | 40 |
| | Flow Rate of Ethylene/Propylene (NLM/NLM) | | 1.6/1.0 | 1.6/1.0 | 1.4/1.0 | 1.7/1.0 | 1.6/1.0 |
| | Temperature (° C.) | | 57 | 57 | 57 | 57 | 57 |

DCPDMS: Dicyclopentyldimethoxysilane
* (Reaction Amount in 2nd stage)/(Reaction Amount in 1st stage + Reaction Amount in 2nd stage) × 100

| | | | Example | | | | |
|---|---|---|---|---|---|---|---|
| | | | 6 | 7 | 8 | 9 | 10 |
| Homo-polymerization | Ti (mmols) | | 0.05 | 0.05 | 0.05 | 0.05 | 0.05 |
| | TEA (mmols) | | 7.5 | 7.5 | 7.5 | 7.5 | 7.5 |
| | Organosilicon Compound | Type | DCPDMS | DCPDMS | DCPDMS | DCPDMS | DCPDMS |
| | | Si (mmols) | 0.5 | 0.5 | 0.6 | 0.5 | 0.5 |
| | 1st stage | Temperature (° C.) | 80 | 80 | 80 | 80 | 80 |
| | | Propylene Partial Pressure (kg/cm$^2$) | 6.5 | 6.5 | 6.5 | 6.5 | 6.5 |
| | | Hydrogen Partial Pressure (kg/cm$^2$) | 3.2 | 3.2 | 3.2 | 3.2 | 3.6 |
| | | Time (min) | 120 | 120 | 120 | 120 | 120 |
| | 2nd stage | Temperature (° C.) | 80 | 80 | 80 | 80 | 80 |
| | | Propylene Partial Pressure (kg/cm$^2$) | 5.5 | 5.5 | 5.5 | 5.5 | 5.5 |
| | | Hydrogen Partial Pressure (kg/cm$^2$) | 0.2 | 0.2 | 0.2 | 0.2 | 0.2 |

TABLE 1-continued

|  |  |  |  |  |  |  |
|---|---|---|---|---|---|---|
|  | Pressure (kg/cm$^2$) |  |  |  |  |  |
|  | Time (min) | 40 | 40 | 40 | 40 | 50 |
|  | (2nd stage)/(1st stage + 2nd stage)* | 11.2 | 9.8 | 9.8 | 9.8 | 12.6 |
| Co- | Hydrogen Partial Pressure (kg/cm$^2$) | 0.33 | 0.28 | 0.29 | 0.27 | 0.30 |
| polymerization | Time (min) | 40 | 40 | 40 | 40 | 40 |
|  | Flow Rate of Ethylene/Propylene (NLM/NLM) | 1.4/1.0 | 1.7/1.0 | 1.7/1.0 | 1.7/1.0 | 1.7/1.0 |
|  | Temperature (° C.) | 57 | 57 | 57 | 57 | 57 |

DCPDMS: Dicyclopentyldimethoxysilane
* (Reaction Amount in 2nd stage)/(Reaction Amount in 1st stage + Reaction Amount in 2nd stage) × 100

|  |  |  | Comparative Example | | | | |
|---|---|---|---|---|---|---|---|
|  |  |  | 1 | 2 | 3 | 4 | 5 |
| Homo- | Ti (mmols) |  | 0.05 | 0.05 | 0.05 | 0.05 | 0.05 |
| polymerization | TEA (mmols) |  | 7.5 | 7.5 | 7.5 | 7.5 | 7.5 |
|  | Organosilicon Compound Type |  | DCPDMS | DCPDMS | DCPDMS | DCPDMS | TBPDMS |
|  |  | Si (mmols) | 0.5 | 0.6 | 0.6 | 0.5 | 0.5 |
|  | 1st stage | Temperature (° C.) | 80 | 80 | 80 | 80 | 80 |
|  |  | Propylene Partial Pressure (kg/cm$^2$) | 6.5 | 6.5 | 6.5 | 6.5 | 6.5 |
|  |  | Hydrogen Partial Pressure (kg/cm$^2$) | 3.2 | 3.0 | 3.2 | 3.8 | 2.7 |
|  |  | Time (min) | 120 | 120 | 120 | 120 | 120 |
|  | 2nd stage | Temperature (° C.) | 80 | 80 | 80 | 80 | 80 |
|  |  | Propylene Partial Pressure (kg/cm$^2$) | 5.5 | 5.5 | 5.5 | 5.5 | 5.5 |
|  |  | Hydrogen Partial Pressure (kg/cm$^2$) | 0.2 | 0.2 | 0.2 | 0.2 | 0.3 |
|  |  | Time (min) | 40 | 50 | 40 | 50 | 40 |
|  | (2nd stage)/(1st stage + 2nd stage)* |  | 8.8 | 8.0 | 8.5 | 13.9 | 8.8 |
| Co- | Hydrogen Partial Pressure (kg/cm$^2$) |  | 0.25 | 0.25 | 0.15 | 0.50 | 0.25 |
| polymerization | Time (min) |  | 50 | 40 | 40 | 50 | 40 |
|  | Flow Rate of Ethylene/Propylene (NLM/NLM) |  | 3.5/0.3 | 3.5/0.3 | 3.3/0.3 | 3.3/0.3 | 1.5/0.3 |
|  | Temperature (° C.) |  | 57 | 57 | 57 | 57 | 57 |

DCPDMS: Dicyclopentyldimethoxysilane
TBPDMS: Tert-butylpropyldimethoxysilane
* (Reaction Amount in 2nd stage)/(Reaction Amount in 1st stage + Reaction Amount in 2nd stage) × 100

|  |  |  | Comparative Example | | | | |
|---|---|---|---|---|---|---|---|
|  |  |  | 6 | 7 | 8 | 9 | 10 |
| Homo- | Ti (mmols) |  | 0.05 | 0.05 | 0.05 | 0.05 | 0.05 |
| polymerization | TEA (mmols) |  | 7.5 | 7.5 | 7.5 | 7.5 | 7.5 |
|  | Organosilicon Compound Type |  | DCPDMS | DCPDMS | DCPDMS | CHMDMS | DCPDMS |
|  |  | Si (mmols) | 0.5 | 0.5 | 0.5 | 0.5 | 0.5 |
|  | 1st stage | Temperature (° C.) | 80 | 80 | 80 | 80 | 80 |
|  |  | Propylene Partial Pressure (kg/cm$^2$) | 6.5 | 6.5 | 6.5 | 6.5 | 6.5 |
|  |  | Hydrogen Partial Pressure (kg/cm$^2$) | 3.8 | 4.2 | 3.2 | 2.0 | 3.2 |
|  |  | Time (min) | 120 | 120 | 120 | 120 | 120 |
|  | 2nd stage | Temperature (° C.) | 80 | 80 | 80 | 80 | 80 |
|  |  | Propylene Partial Pressure (kg/cm$^2$) | 5.5 | 5.5 | 5.5 | 5.5 | 5.5 |
|  |  | Hydrogen Partial Pressure (kg/cm$^2$) | 0.2 | 0.1 | 0.2 | 0.5 | 0.2 |
|  |  | Time (min) | 40 | 50 | 30 | 40 | 40 |
|  | (2nd stage)/(1st stage + 2nd stage)* |  | 9.2 | 10.8 | 9.8 | 11.2 | 10.1 |
| Co- | Hydrogen Partial Pressure (kg/cm$^2$) |  | 0.30 | 0.30 | 0.28 | 0.20 | 1.5 |
| polymerization | Time (min) |  | 40 | 50 | 40 | 40 | 40 |
|  | Flow Rate of Ethylene/Propylene (NLM/NLM) |  | 3.7/0.3 | 3.7/0.3 | 1.6/1.0 | 2.5/0.5 | 1.7/1.0 |
|  | Temperature (° C.) |  | 57 | 57 | 57 | 57 | 57 |

DCPDMS: Dicyclopentyldimethoxysilane
CHMDMS: Cyclohexylmethyldimethoxysilane
* (Reaction Amount in 2nd stage)/(Reaction Amount in 1st stage + Reaction Amount in 2nd stage) × 100

TABLE 2

|  |  |  | Example | | | | |
|---|---|---|---|---|---|---|---|
|  |  |  | 1 | 2 | 3 | 4 | 5 |
| Poly-propylene-based Resin | MI (g/10 min) |  | 42 | 47.9 | 44 | 47 | 40 |
|  | 25° C. xylene-soluble component | Content, x, wt. % | 6.7 | 7.6 | 7.7 | 6.8 | 7.2 |
|  |  | Ethylene unit content, z, wt. % | 25.1 | 24.5 | 23.8 | 29.8 | 26.8 |
|  |  | $[\eta]$ (dl/g) | 3.0 | 2.47 | 2.61 | 2.77 | 2.69 |
|  | 25° C. xylene-insoluble component | Content, wt. % | 93.3 | 92.4 | 92.3 | 93.2 | 92.8 |
|  |  | Ethylene unit content, y, wt. % | 0.63 | 0.80 | 0.70 | 1.13 | 0.92 |
|  |  | Formula (I) | Satisfied | Satisfied | Satisfied | Satisfied | Satisfied |
|  |  | Content of Component with MW of not smaller than $10^6$, wt. % | 2.4 | 2.8 | 2.4 | 2.4 | 2.4 |
|  |  | MI (g/10 min) | 66 | 58 | 66 | 66 | 66 |
|  |  | Stereospecificity Index | 98.9 | 99.1 | 99.2 | 98.7 | 98.8 |

|  |  |  | Example | | | | |
|---|---|---|---|---|---|---|---|
|  |  |  | 6 | 7 | 8 | 9 | 10 |
| Poly-propylene-based Resin | MI (g/10 min) |  | 37.9 | 39.4 | 41.1 | 41.4 | 38.1 |
|  | 25° C. xylene-soluble component | Content, x, wt. % | 7.5 | 6.1 | 5.4 | 5.7 | 7.2 |
|  |  | Ethylene unit content, z, wt. % | 22.2 | 29.0 | 28.7 | 30.0 | 29.3 |
|  |  | $[\eta]$ (dl/g) | 2.87 | 3.34 | 3.11 | 3.24 | 2.93 |
|  | 25° C. xylene-insoluble component | Content, wt. % | 92.5 | 93.9 | 94.6 | 94.3 | 92.8 |
|  |  | Ethylene unit content, y, wt. % | 0.68 | 0.77 | 0.60 | 0.94 | 0.60 |
|  |  | Formula (I) | Satisfied | Satisfied | Satisfied | Satisfied | Satisfied |
|  |  | Content of Component with MW of not smaller than $10^6$, wt. % | 2.4 | 2.3 | 2.3 | 2.3 | 2.3 |
|  |  | MI (g/10 min) | 66 | 65 | 65 | 65 | 57 |
|  |  | Stereospecificity Index | 98.6 | 98.9 | 99.0 | 98.7 | 98.9 |

|  |  |  | Comparative Example | | | | |
|---|---|---|---|---|---|---|---|
|  |  |  | 1 | 2 | 3 | 4 | 5 |
| Poly-propylene-based Resin | MI (g/10 min) |  | 37.2 | 40.0 | 41.9 | 29.5 | 43.6 |
|  | 25° C. xylene-soluble component | Content, x, wt. % | 9.1 | 6.9 | 7.8 | 12.7 | 10.5 |
|  |  | Ethylene unit content, z, wt. % | 37.1 | 37.2 | 34.1 | 35.9 | 29.6 |
|  |  | $[\eta]$ (dl/g) | 3.83 | 3.77 | 4.11 | 2.27 | 3.82 |
|  | 25° C. xylene-insoluble component | Content, wt. % | 90.9 | 93.1 | 92.2 | 87.3 | 89.5 |
|  |  | Ethylene unit content, y, wt. % | 2.65 | 2.26 | 1.57 | 1.92 | 3.05 |
|  |  | Formula (I) | Satisfied | Satisfied | Satisfied | Satisfied | Not satisfied |
|  |  | Content of Component with MW of not smaller than $10^6$, wt. % | 2.2 | 3.2 | 2.7 | 3.8 | 2.2 |
|  |  | MI (g/10 min) | 67.5 | 73.4 | 57.5 | 50 | 68 |
|  |  | Stereospecificity Index | 98.9 | 98.7 | 99.0 | 98.9 | 98.5 |

|  |  |  | Comparative Example | | | | |
|---|---|---|---|---|---|---|---|
|  |  |  | 6 | 7 | 8 | 9 | 10 |
| Poly-propylene-based Resin | MI (g/10 min) |  | 62.7 | 52.1 | 53.2 | 47 | 50.3 |
|  | 25° C. xylene-soluble component | Content, x, wt. % | 11.1 | 12.5 | 6.2 | 6.8 | 6.1 |
|  |  | Ethylene unit content, z, wt. % | 42 | 42 | 28.4 | 29.8 | 29.0 |
|  |  | $[\eta]$ (dl/g) | 2.8 | 2.8 | 3.37 | 2.77 | 1.70 |
|  | 25° C. xylene-insoluble component | Content, wt. % | 88.9 | 87.5 | 93.8 | 93.2 | 93.9 |
|  |  | Ethylene unit content, y, wt. % | 4.15 | 4.41 | 0.77 | 1.13 | 0.77 |
|  |  | Formula (I) | Satisfied | Satisfied | Satisfied | Satisfied | Satisfied |
|  |  | Content of Component with MW of not smaller than $10^6$, wt. % | 3.2 | 3.6 | 1.8 | 2.4 | 2.3 |
|  |  | MI (g/10 min) | 98 | 108 | 88 | 66 | 70 |
|  |  | Stereospecificity Index | 99.1 | 99.0 | 98.8 | 97.9 | 99.1 |

TABLE 3

|  |  | Example | | | | |
|---|---|---|---|---|---|---|
|  |  | 1 | 2 | 3 | 4 | 5 |
| Formulation (wt. %) | Polypropylene-based Resin | 63.5 | 64 | 63 | 63.5 | 65 |
|  | Elastomer | 15.5 | 16 | 15 | 16.5 | 15 |
|  | Talc | 21 | 20 | 22 | 20 | 20 |
| Elastomer Used | Type | SEPS | SEBS | SEBS | SEBS | SEBS |
|  | Trade Name | A | B | B | B | B |
|  | Styrene Unit Content (wt. %) | 30 | 13 | 13 | 13 | 13 |
| Physical Properties of Composition | Modulus of Bending Elasticity (MPa) | 2510 | 2520 | 2590 | 2520 | 2630 |
|  | Izod Impact Strength (kJ/m$^2$) | 42 | 38 | 40 | 45 | 39 |

TABLE 3-continued

|  |  |  |  |  |  |  |
|---|---|---|---|---|---|---|
|  | Tensile Breaking Elongation (%) | 210 | 200 | 340 | 260 | 250 |
|  | MI (g/10 min) | 28 | 27 | 32 | 29 | 30 |

|  |  | Example | | | | |
|---|---|---|---|---|---|---|
|  |  | 6 | 7 | 8 | 9 | 10 |
| Formulation (wt. %) | Polypropylene-based Resin | 66 | 63 | 63 | 62 | 65 |
|  | Elastomer | 15 | 15 | 18 | 17 | 15 |
|  | Talc | 19 | 22 | 19 | 21 | 20 |
| Elastomer Used | Type | SEPS | SEBS | EOM | EOM | CEBC |
|  | Trade Name | A | B | D | C | E |
|  | Styrene Unit Content (wt. %) | 30 | 13 | 0 | 0 | 0 |
| Physical Properties of Composition | Modulus of Bending Elasticity (MPa) | 2460 | 2650 | 2450 | 2660 | 2650 |
|  | Izod Impact Strength (kJ/m$^2$) | 42 | 35 | 35 | 34 | 37 |
|  | Tensile Breaking Elongation (%) | 560 | 250 | 350 | 630 | 250 |
|  | MI (g/10 min) | 27 | 28 | 29 | 24 | 39 |

|  |  | Comparative Example | | | | |
|---|---|---|---|---|---|---|
|  |  | 1 | 2 | 3 | 4 | 5 |
| Formulation (wt. %) | Polypropylene-based Resin | 66 | 65 | 63 | 69 | 66 |
|  | Elastomer | 13 | 14 | 16 | 10 | 13 |
|  | Talc | 21 | 21 | 21 | 21 | 21 |
| Elastomer Used | Type | SEBS | SEBS | SEBS | SEBS | SEBS |
|  | Trade Name | B | B | B | B | B |
|  | Styrene Unit Content (wt. %) | 13 | 13 | 13 | 13 | 13 |
| Physical Properties of Composition | Modulus of Bending Elasticity (MPa) | 2420 | 2540 | 2540 | 2710 | 2420 |
|  | Izod Impact Strength (kJ/m$^2$) | 23 | 25 | 44 | 28 | 27 |
|  | Tensile Breaking Elongation (%) | 50 | 60 | 130 | 40 | 20 |
|  | MI (g/10 min) | 30 | 29 | 28 | 28 | 29 |

|  |  | Comparative Example | | | | |
|---|---|---|---|---|---|---|
|  |  | 6 | 7 | 8 | 9 | 10 |
| Formulation (wt. %) | Polypropylene-based Resin | 67 | 67 | 62 | 63.5 | 63 |
|  | Elastomer | 12 | 12 | 17 | 16.5 | 15 |
|  | Talc | 21 | 21 | 21 | 20 | 22 |
| Elastomer Used | Type | SEBS | SEBS | SEBS | SEBS | SEBS |
|  | Trade Name | B | B | B | B | B |
|  | Styrene Unit Content (wt. %) | 13 | 13 | 13 | 13 | 13 |
| Physical Properties of Composition | Modulus of Bending Elasticity (MPa) | 2580 | 2550 | 2390 | 2220 | 2510 |
|  | Izod Impact Strength (kJ/m$^2$) | 17 | 24 | 44 | 45 | 22 |
|  | Tensile Breaking Elongation (%) | 10 | 40 | 180 | 260 | 22 |
|  | MI (g/10 min) | 45 | 42 | 35 | 29 | 42 |

[Notes]
Trade Name of Elastomer
A: Hydrogenated styrene-isoprene-styrene block copolymer, SEPTON 2007, manufactured by Kuraray Co., Ltd.
B: Hydrogenated styrene-butadiene-styrene block copolymer, KRATON G-1657X, manufactured by Shell Chemical Co.
C: Ethylene-octene-1 copolymer, ENGAGE EG8180, manufactured by Dow Chemical Co.
D: Ethylene-octene-1 copolymer, ENGAGE EG8200, manufactured by Dow Chemical Co.
E: Hydrogenated 1,2-butadiene-1,4-butadiene copolymer, DYNARON 6110P, manufactured by Japan Synthetic Rubber Co., Ltd.

In the samples of Comparative Examples 1 to 4, 6 and 7, the ethylene unit content of the 25° C. xylene-soluble component is much larger than 30% by weight. Therefore, the tensile breaking elongation and the Izod impact strength of these comparative samples are lower than those of the samples of Examples.

In the sample of Comparative Example 5, the ethylene unit content of the 25° C. xylene-insoluble component does not satisfies the formula (I). Therefore, the tensile breaking elongation and the Izod impact strength of this comparative sample are lower than those of the samples of Examples.

In the sample of Comparative Example 8, the content of the component having a molecular weight of not smaller than $10^6$ in the 25° C. xylene-insoluble component is smaller than 2% by weight. Therefore, the modulus of bending elasticity of this comparative sample is lower than that of the samples of Examples.

In the sample of Comparative Example 9, the stereospecificity index of the 25° C. xylene-insoluble component is lower than 98.5%. Therefore, the modulus of bending elasticity of this comparative sample is lower than that of the samples of Examples.

In the sample of Comparative Example 10, the intrinsic viscosity [η] of the 25° C. xylene-soluble component is smaller than 2 dl/g. Therefore, the Izod impact strength of this comparative sample is lower than that of the samples of Examples.

EXAMPLES 11 TO 16 AND COMPARATIVE EXAMPLES 11 TO 14

The components shown in Table 4 below were put into a kneader, 2FCM50 φ (manufactured by Kobe Steel, Ltd.) all at once, and kneaded to prepare pellets of various polypropylene-based resin compositions.

Next, the pellets were molded, using an injection molding machine, IS100F3 (manufactured by Toshiba Machine Co., Ltd.), into JIS test pieces for measurement of physical properties. The physical properties of these test pieces were measured in the manner mentioned below. The data obtained are shown in Table 4. In Table 4-2, the hardness of the sample of Comparative Example 13 was too low to measure its Rockwell hardness.

(1) Modulus of Bending Elasticity

Each sample was tested at 23° C. in accordance with JIS K-7203.

(2) Low-temperature Impact Strength

Each sample was tested at −30° C. in accordance with JIS K-7110.

(3) Rockwell Hardness R

Each sample was tested at 23° C. in accordance with JISK-7202. The Rockwell hardness R is a criterion of the stiffness of the sample.

TABLE 4

|  |  | Example | | | | | |
|---|---|---|---|---|---|---|---|
|  |  | 11 | 12 | 13 | 14 | 15 | 16 |
| Formulation (wt. %) | PP | 75 | 70 | 60 | 75 | 65 | 60 |
|  | EBM-1 | 25 | — | 30 | 20 | — | — |
|  | EBM-2 | — | 30 | — | — | 25 | 35 |
|  | EBM-3 | — | — | — | — | — | — |
|  | EBM-4 | — | — | — | — | — | — |
|  | Talc | — | — | 10 | 5 | 10 | 5 |
| Physical Properties of Composition | Modulus of Bending Elasticity (MPa) | 800 | 690 | 930 | 1100 | 1110 | 790 |
|  | Izod Impact Strength | 11 | Not broken | Not broken | 9 | Not broken | Not broken |

TABLE 4-continued

|  |  | ken | ken |  | ken | ken |
|---|---|---|---|---|---|---|
| (J/m²) |  |  |  |  |  |  |
| Rockwell | 38 | 20 | 19 | 47 | 37 | 10 |
| Hardness, R |  |  |  |  |  |  |

|  |  | Comparative Example | | | |
|---|---|---|---|---|---|
|  |  | 11 | 12 | 13 | 14 |
| Formulation (wt. %) | PP | 70 | 75 | 40 | 65 |
|  | EBM-1 | — | — | 50 | — |
|  | EBM-2 | — | — | — | — |
|  | EBM-3 | 30 | — | — | 25 |
|  | EBM-4 | — | 25 | — | — |
|  | Talc | — | — | 10 | 10 |
| Physical Properties of Composition | Modulus of Bending Elasticity (MPa) | 710 | 820 | 420 | 950 |
|  | Izod Impact Strength (J/m²) | 10 | 6 | Not broken | 10 |
|  | Rockwell Hardness, R | 19 | 50 | Immeasurable | 29 |

[Notes]
PP: Polypropylene, J-6083H (trade name of Idemitsu Petrochemical Co., Ltd.), having an MI of 50 g/10 min and an ethylene unit content of 6% by weight.
EBM-1: Ethylene-butene-1 copolymer, IT100 (trade name of Mitsui Petrochemical Industries, Ltd.), having an MI of 2 g/10 min, a butene-1 unit content of 17 mol %, a peak melting point of 37° C., a quantity of heat for crystallization of 34 J/g, and a ratio, (quantity of heat for crystallization)/(butene-1 unit content) of 2.0.
EBM-2: Ethylene-butene-1 copolymer, IT101 (trade name of Mitsui Petrochemical Industries, Ltd.), having an MI of 0.5 g/10 min, a butene-1 unit content of 17 mol %, a peak melting point of 36° C., a quantity of heat for crystallization of 33 J/g, and a ratio, (quantity of heat for crystallization)/(butene-1 unit content) of 1.9.
EBM-3: Ethylene-butene-1 copolymer, B136 (trade name of Japan Synthetic Rubber Co., Ltd.), having an MI of 2 g/10 min, a butene-1 unit content of 18 mol %, a peak melting point of 22° C., a quantity of heat for crystallization of 20 J/g, and a ratio, (quantity of heat for crystallization)/(butene-1 unit content) of 1.1.
EBM-4: Ethylene-butene-1 copolymer, A1085 (trade name of Mitsui Petrochemical Industries, Ltd.), having an MI of 2 g/10 min, a butene-1 unit content of 11 mol %, a peak melting point of 73° C., a quantity of heat for crystallization of 55 J/g, and a ratio, (quantity of heat for crystallization)/(butene-1 unit content) of 5.5.
Talc: JM156 (trade name of Asada Flour Milling Co., Ltd.), having a mean particle size of 1.5 μm.

As has been mentioned in detail hereinabove, the polypropylene-based resin and the polypropylene-based resin composition of the present invention have well-balanced flowability and impact resistance, which are higher than those of conventional ones, and are therefore suitably used as shaping materials, for example, for car parts (e.g., bumpers, side members, air spoilers, trims, etc.), household electric appliances, daily necessaries, etc.

While the invention has been described in detail and with reference to specific embodiments thereof, it will be apparent to one skilled in the art that various changes and modifications can be made therein without departing from the spirit and scope thereof.

What is claimed is:

1. A propylene-based resin composition comprising:
    component (A): from 45 to 90% by weight of the polypropylene-based resin which is a mixture of an isotactic homopolymer of propylene and an ethylene-propylene random copolymer and has the following characteristics:
    (1) a melt index of from 30 to 70 g/10 min,
    (2) a 25° C. xylene-soluble component (x) of from 5 to 15 wt. %,
    an ethylene unit content (z) of from 20 to 30 wt %,
    an intrinsic viscosity (η) of from 2.00 to 3.34,
    (3) a 25° C. xylene-insoluble component,
    an ethylene unit content (y) that satisfies the relational formula (I)

$$100y/[y(1-x/100)+x] \geq 1.13z - 16.6 \quad (I)$$

the content of its constituent component having a molecular weight of higher than $10^6$, is higher than 2% by weight,
    a melt index of from 40 to 130 g/10 min
    its isotactic pentad stereospecificity index is higher than 98.5%; component (B): from 5 to 50% by weight of an ethylene-butene-1 copolymer having the following characteristics:
    (4) a butene-1 unit content of from 10 to 25 mol %.
    (5) a melt index of from 1 to 10; and component (C) from 0 to 25% by weight of talc.

2. The polypropylene-based resin composition as claimed in claim 1, which comprises from 55 to 75% by weight of the component (A), from 10 to 20% by weight of the component (B), and from 15 to 25% by weight of the component (C).

3. A polypropylene-based resin composition comprising
    component (A') from 45 to 70% by weight of a polypropylene-based resin which is a mixture of an isotactic homopolymer of propylene and an ethylene-propylene random copolymer and has the following characteristics;
    (1) a melt index of from 50 to 100
    (2) an ethylene-propylene random copolymer content of (A') of from 3 to 20 wt %
    an ethylene unit content of from 20 to 35 wt %;
    component (B'): from 25 to 50% by weight of an ethylene-butene-1 copolymer which prior to forming the mixture has the following characteristics:
    (3) a butene-1 unit content of from 10 to 25 mol %,
    (4) a melt index of from 1 to 10 g/10 min,
    (5) a peak melting point of from 20 to 50° C.,
    (6) a quantity of heat for crystallization of from 20 to 50 J/g, and
    (7) a ratio of the quantity of heat for crystallization (J/g) to the butene-1 unit content (mol %) of higher than 1.4, and
    component (C) from 5 to 25% by weight of talc.

4. The propylene-based resin composition as claimed in claim 3, wherein the polypropylene-based resin of the component (A') is a mixture comprising a homopolymer of propylene having an isotactic structure and an ethylene-propylene random copolymer, formed by copolymerization of ethylene and propylene in the presence of said polypropylene homopolymer.

5. The polypropylene-based resin composition as claimed in claim 4, wherein the copolymer moiety in the polypropylene-based resin of the component (A') is obtained as the constituent component that is soluble in xylene at 25° C.

6. The polypropylene-based resin composition as claimed in claim 3 or 4, which comprises from 50 to 70% by weight of the component (A'), from 25 to 40% by weight of the component (B'), and from 5 to 15% by weight of the component (C).

* * * * *